United States Patent
Horibe et al.

(10) Patent No.: US 7,215,631 B2
(45) Date of Patent: May 8, 2007

(54) SIGNAL PROCESSING DEVICE AND SIGNAL PROCESSING METHOD

(75) Inventors: Ryusuke Horibe, Hirakata (JP); Kazutoshi Aida, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 106 days.

(21) Appl. No.: 10/510,988

(22) PCT Filed: Dec. 25, 2003

(86) PCT No.: PCT/JP03/16842

§ 371 (c)(1),
(2), (4) Date: Oct. 13, 2004

(87) PCT Pub. No.: WO2004/061845

PCT Pub. Date: Jul. 22, 2004

(65) Prior Publication Data

US 2005/0180298 A1    Aug. 18, 2005

(30) Foreign Application Priority Data

Dec. 27, 2002   (JP) .............................. 2002-379155

(51) Int. Cl.
*G11B 7/00* (2006.01)
(52) U.S. Cl. ............................... 369/124.1; 369/59.15; 369/53.32
(58) Field of Classification Search ............. 369/124.1, 369/124.11, 59.15, 53.32, 47.25
See application file for complete search history.

(56) References Cited

U.S. PATENT DOCUMENTS

| 5,412,632 | A | * | 5/1995 | Mita et al. ............... 369/47.27 |
| 6,765,856 | B2 | * | 7/2004 | Tonami ..................... 369/59.2 |
| 2002/0012306 | A1 | * | 1/2002 | Hayami et al. .......... 369/59.21 |
| 2002/0172112 | A1 | * | 11/2002 | Shoji et al. .............. 369/47.35 |
| 2004/0172148 | A1 | * | 9/2004 | Horibe ........................ 700/94 |
| 2004/0257956 | A1 | * | 12/2004 | Noda et al. .............. 369/59.26 |

FOREIGN PATENT DOCUMENTS

| JP | 9-36746 A | 2/1997 |
| JP | 10-320920 A | 12/1998 |
| JP | 2001-23304 A | 1/2001 |
| JP | 2001-250334 A | 9/2001 |

* cited by examiner

*Primary Examiner*—Nabil Hindi
(74) *Attorney, Agent, or Firm*—McDermott Will & Emery LLP

(57) ABSTRACT

A feedback loop structure including an operational amplifier unit (1) for amplifying a reproduction signal of recorded information and a gain/offset control unit (6) for controlling an amplitude and an offset of an output of the operational amplifier unit (1) so that each of the amplitude and the offset becomes a predetermined value is adopted, and accurate information for an asymmetry amount is obtained by a binarization unit (7) for receiving the output of the operational amplifier unit (1) and performing binarization while adjusting a slice level by feedback control so that a duty ratio after the binarization substantially becomes a predetermined value. Based on the asymmetry amount information, a judgment level of a Viterbi decoding unit (15) is changed, thereby reducing a reproduction error rate.

22 Claims, 14 Drawing Sheets

ASYMMETRY ABSENT

ASYMMETRY PRESENT

WAVEFORM ALIASING PRESENT

SIGNAL PROCESSING DEVICE AND SIGNAL PROCESSING METHOD

TECHNICAL FIELD

The present invention relates to a technique for accurately detecting an asymmetry amount of a reproduction signal generated due to change in recording conditions and the like and, furthermore, reducing an error rate using information for the asymmetry amount in a signal processing device for reproducing data from recorded information on an information recording medium.

BACKGROUND ART

In recent years, a rapid development of increasing the density of optical disks has been made and, with this rapid development, recording of a moving picture image with a large capacity has become possible. Moreover, optical disks as a storage medium have excellent properties such as excellent capacitive properties and high speed accessibility, can be provided at low cost, and also is interchangeable. In view of these points, it is highly possible that optical disks will take place tape recording medium.

As for recording methods for optical disks, there are the PPM (pulse point modulation) recording method in which information is indicated on a recording mark and the PWM (pulse width modulation) recording method in which information is indicated on a recording mark edge. At present, the PWM recording method advantageous to increasing density has been used in most cases.

In the PWM recording method, when a recording mark is formed to be large or small depending on recording conditions, the duty ratio of a reproduction signal shifts from a predetermined value, resulting in the generation of asymmetric waveform distortion in the amplitude direction. This phenomenon is called "asymmetry".

When a disk such as a CD (compact disk) and a DVD (digital versatile disk) in which data is recorded with a discrete mark length and a discrete space length is played and observation is made using an oscilloscope, a waveform of FIG. 1(a) or FIG. 1(b) is obtained. In general, such waveforms are called "eye pattern". When asymmetry is absent, the waveform of FIG. 1(a) is obtained, and when asymmetry is present, the waveform of FIG. 1(b) is obtained. In this case, a hatched portion having a rhombus shape is called "eye diagram" and a shift of an eye center level with respect to a reproduction waveform center (the center of a waveform) in the vertical direction shows an asymmetry amount. In the PWM recording method, information is held at a recording mark edge, and when asymmetry is present, a shift of a recording edge occurs. Thus, a measure for this problem is needed.

Assume that data reproduction is carried out by a simple binarization of a reproduction signal. For example, when recording modulation in which no direct current (DC) component is used as in a CD, influence of asymmetry can be almost eliminated, for example, by performing feedback control of a binarization level so that the duty ratio after the binarization becomes 50:50. Thus, influence of asymmetry can be substantially eliminated.

FIG. 2 is a block diagram illustrating an example of a conventional binarization circuit. This binarization circuit includes a comparator circuit 100 for binarizing a reproduction signal at a predetermined level, an integrator circuit 101 for integrating a comparator circuit output, a ripple removing filter 102 for removing a ripple of an integrator circuit output, and a buffer circuit 103 for performing feedback of a ripple removing filter output to the comparator circuit 100. In this case, binarization levels appear around the respective eye center levels of the eye diagrams of FIG. 1(a) and FIG. 1(b).

However, as shown in FIG. 3, when aliasing distortion of a reproduction waveform is generated and a large asymmetry is present, a binarization level overlaps aliasing part of the waveform and binarization can not be properly performed with the configuration of FIG. 2. As a result, data is not properly reproduced. Such aliasing distortion of a reproduction waveform is apt to occur when a laser spot diameter is reduced more than necessary on a recording surface or when a high frequency band of the reproduction signal is emphasized by an equalizer or the like.

On the other hand, in a digital reproduction signal processing system using a Viterbi decoder, a reproduction signal is sampled by an analog-to-digital converter (which will be hereinafter referred to as an "AD converter") and decoded data corresponding to a state transition maximum-likelihood-estimated based on multilevel data obtained through the sampling is output. Ideally, vertical asymmetry of the amplitude direction of the reproduction signal is required.

FIG. 4 is a block diagram illustrating an exemplary block diagram of a conventional signal processing device using the PRML (partial response maximum likelihood) technique. The signal processing device includes an AD converter 104 for analog-to-digital converting a reproduction signal (RS1), a baseline processing circuit 105 for removing a DC fluctuation component from an AD conversion signal (AD-COUT), a PLL circuit 106 for extracting phase error information from a baseline processing signal (BCDT) to generate a clock phase-synchronized with an input reproduction signal, an FIR (finite impulse response) filter 107 for receiving the baseline processing signal as an input and performing waveform equalization, an LMS (least mean square) circuit 108 for adaptively adjusting tap coefficients of the FIR filter 107 so that an equalization error becomes minimum, and a Viterbi decoder 109 for outputting decoded data corresponding to the maximum-likelihood-estimated state transition from an FIR filter output (FIRDT).

With the configuration of FIG. 4 to which the PRML technique is introduced, it is possible to largely improve an error rate, compared to data reproduction by the simple binarization shown in FIG. 2, and improve the performance of the signal processing device. However, the PRML technique is designed based on an ideal waveform exhibiting vertical symmetry in the amplitude direction, and when strong asymmetry occurs in a reproduction signal and the vertical symmetry in the amplitude direction is largely lost, the Viterbi decoder 109 does not properly operate.

Note that as a conventional signal processing method, a method in which based on a reproduction signal value and operation results of Viterbi decoding, an amplitude reference value used as a reference value when a value for brantimetric is updated for each clock, thereby performing a predetermined calculation based on the amplitude reference value (see Japanese Laid-Open Publication No. 10-320920) is known.

Moreover, a method in which a reproduction signal output from a waveform equalization circuit (equalizer) is sliced at a slice level and the slice level is used as information for the asymmetry amount and a method in which maximum and minimum values of a reproduction signal are detected and a reproduction signal amplitude is made to be constant by amplitude detection to reduce a detection error (see Japanese Laid-Open Publication No. 2001-250334) are known.

However, in general, the amplitude of a reproduction signal from a pickup for reading recorded information is very small. Therefore, it is necessary to acquire a large gain so that a desired signal amplitude is achieved in an amplifier in a subsequent stage, but amplification by DC coupling is difficult because of a constraint of a dynamic range of the subsequent stage amplifier. Therefore, a method in which a DC component is removed by capacitive coupling and then a large amplification is performed is used in many cases. If the DC component is removed, a center level of an eye diagram substantially corresponds to a reference voltage level (i.e., a ground level GND in this case). When asymmetry is absent, a waveform shown in FIG. 5(a) is obtained, and when asymmetry is present, a waveform shown in FIG. 5(b) is obtained. When such a signal is binarized, a binary slice level is located substantially at the center of an eye diagram in each of FIGS. 5(a) and 5(b). Accordingly, the slice levels in FIGS. 5(a) and 5(b) are located around GND and correspond to each other. Thus, the asymmetry amount information can not be obtained from each of the slice levels itself.

DISCLOSURE OF INVENTION

The present invention has been devised for the purpose of solving the above-described problems. It is therefore an object of the present invention to provide a signal processing device and a signal processing method in which by controlling a gain and an offset without depending on asymmetry of a reproduction signal, the location of the center of an eye diagram can be offset-controlled so that the center location is normalized in the amplitude direction and upper and lower envelopes of the reproduction signal are gradually approaching to predetermined levels, respectively, and by detecting the offset-controlled center location of the eye diagram, the asymmetry amount can be accurately detected without depending on an input reproduction signal.

To achieve the above-described object, according to the present invention, in a signal processing device for reproducing recorded information on a information recording medium, a feedback loop structure including an operational amplifier unit for amplifying a reproduction signal of the recorded information and a gain/offset control unit for controlling a gain and an offset of the operational amplifier unit so that each of the amplitude and the offset of an output of the operational amplifier unit becomes a predetermined value is adopted, DC component information of the reproduction signal is extracted from signals of the feedback loop and the DC component information is supplied as information indicating the asymmetry amount of the reproduction signal. With this structure, the signal amplitude and the offset can be controlled so that the reproduction signal is effectively within a predetermined level range and a DC component information with which a duty ratio after binarization substantially becomes a predetermined value can be obtained. Thus, the location of the center of the reproduction signal eye pattern can be detected, so that the asymmetry amount can be accurately measured.

If using information for the asymmetry amount detected in the above-described manner, change of a judgment level of a Viterbi decoder, ON/OFF control of Viterbi decoding, equalizer property control or offset operation of a binarization circuit is performed, the reproduction error rate can be reduced.

BRIEF DESCRIPTION OF DRAWINGS

FIG. 1(a) is a diagram illustrating the case where asymmetry is absent and FIG. 1(b) is a diagram illustrating the case where asymmetry is present.

FIG. 5(a) is a diagram illustrating the case where asymmetry is absent and FIG. 5(b) is a diagram illustrating the case where asymmetry is present.

FIG. 7(a) is a diagram illustrating the case where an equalizer is not provided and FIG. 7(b) is a diagram illustrating the case where an equalizer is provided.

FIG. 8(a) is a diagram illustrating a waveform of a reproduction signal when asymmetry is absent and FIG. 8(b) is a diagram illustrating a waveform of a reproduction signal when asymmetry is present.

FIG. 16(a) is a diagram illustrating a waveform of a reproduction signal when asymmetry is absent and FIG. 16(b) is a diagram illustrating a waveform of a reproduction signal when asymmetry is present.

BEST MODE FOR CARRYING OUT THE INVENTION

Hereinafter, embodiments of the present invention relating to a signal processing device for reproducing a recorded information on information recording medium will be described in detail with reference to the accompanying drawings.

Figure 6:
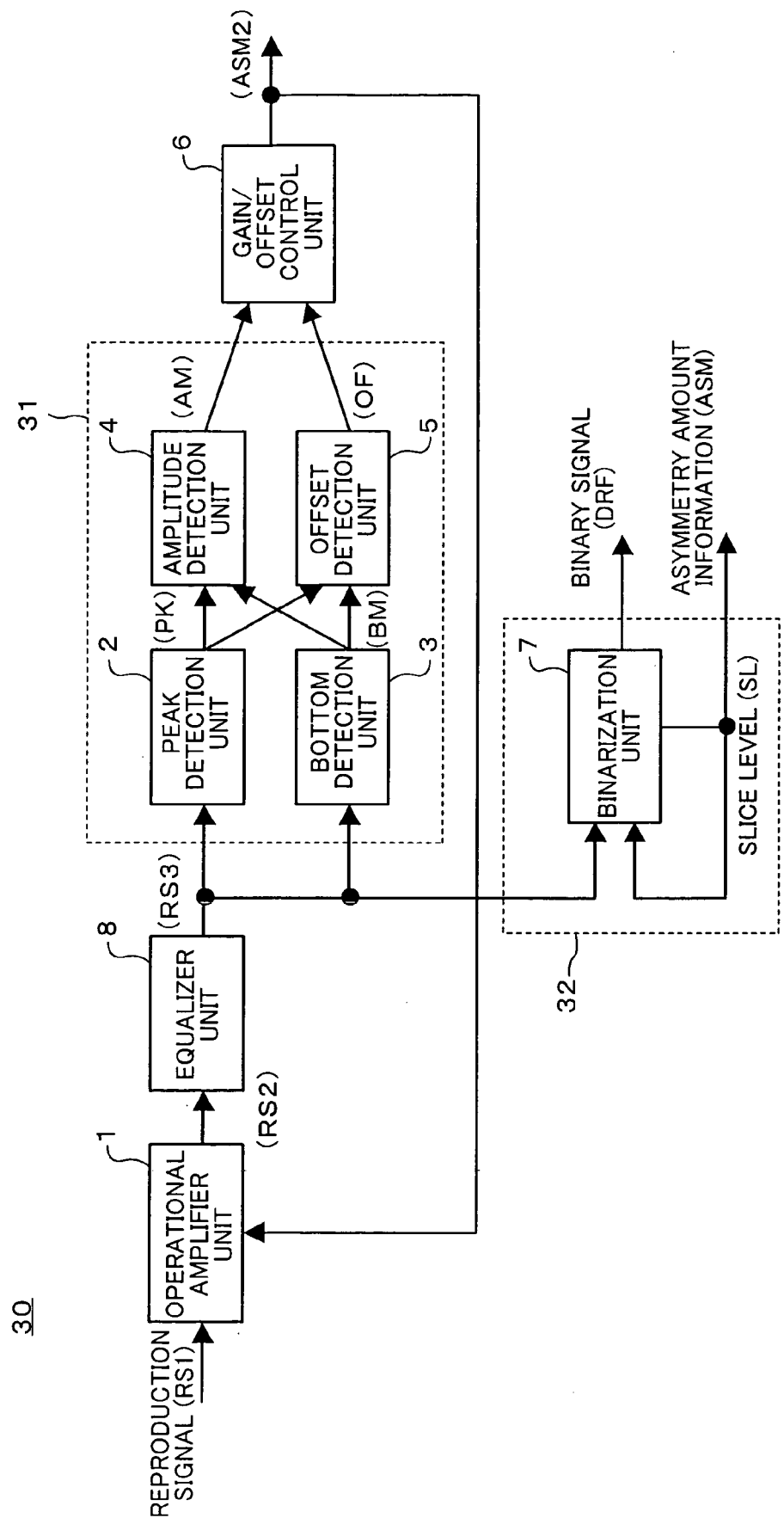
FIG. 6 is a block diagram illustrating an exemplary configuration of an asymmetry detector in a signal processing device according to the present invention.

FIG. 6 is a block diagram of an asymmetry detector in a signal processing device according to the present invention. An asymmetry detector 30 of FIG. 6 includes an operational amplifier unit 1 for receiving a reproduction signal (RS1) of a recorded information on a recording medium as an input and giving a gain corresponding to a gain control signal input and a DC offset corresponding to an offset control signal input, an equalizer unit 8 for emphasizing a high frequency band of an output (RS2) of the operational amplifier unit 1, a peak detection unit 2 for receiving an output (RS3) of the equalizer unit 8 as an input and performing peak detection, a bottom detection unit 3 for receiving the output (RS3) of the equalizer unit 8 as an input and performing bottom detection, an amplitude detection unit 4 for receiving an output (PK) of the peak detection unit 2 and an output (BM) of the bottom detection unit 3 as inputs and outputting an amplitude information signal (AM) with respect to the output of the operational amplifier unit 1, an offset detection unit 5 for receiving the output (PK) of the peak detection unit 2 and the output (BM) of the bottom detection unit 3 as inputs and outputting offset information signal (OF) with respect to the output of the operational amplifier unit 1, a gain/offset control unit 6 for receiving the amplitude information signal (AM) and the offset information signal (OF) as inputs and performing control so that each of the output signal amplitude and output signal offset of the operational amplifier unit 1 becomes a predetermined value, respectively, and a binarization unit 7 for receiving the output (RS3) of the equalizer unit 8 as an input and performing binarization while adjusting a slice level (SL) by feedback control so that the duty ratio after the binarization substantially becomes a predetermined value. The peak detection unit 2, the bottom detection unit 3, the amplitude detection unit 4 and the offset detection unit 5 together constitute a waveform detection unit 31. Moreover, the binarization unit 7 constitutes a DC component extraction unit 32.

Figure 7A:
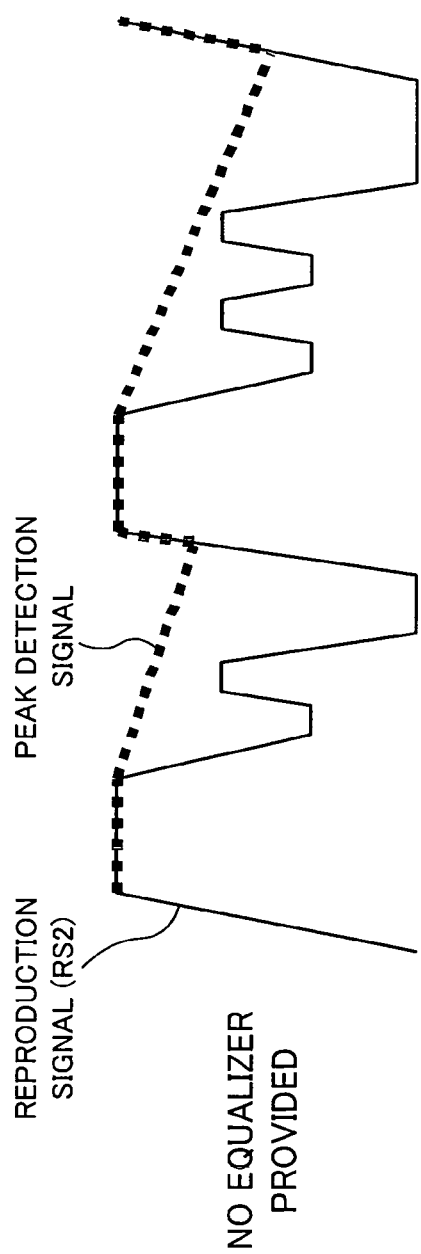
FIGS. 7(a) and 7(b) are diagrams illustrating effects of an equalizer unit of FIG. 6.
Figure 7B:
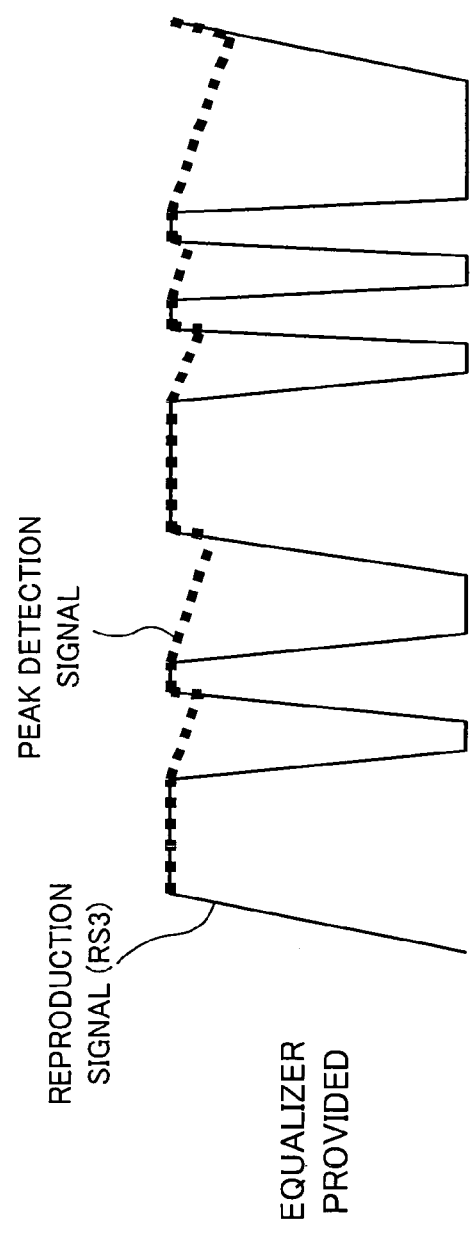

For example, when a recording medium such as a DVD in which data is recorded at high density is played, a reproduction signal amplitude around a shortest recording length (3T in a DVD) accounts for only about 20%, compared to a signal amplitude of a long mark. When peak/bottom detection is performed, based on such a reproduction signal (RS1), from the output (RS2) of the operational amplifier unit 1 as it is, a peak and a bottom of a short mark can not be detected, as shown in FIG. 7(a), so that a detection error is increased. Although in FIG. 7(a), only peak detection is shown, the same result is obtained for bottom detection. Then, a signal amplitude of the short mark is made to pass through the equalizer unit 8 for emphasizing a high frequency band and is amplified by the equalizer unit 8 as shown in FIG. 7(b), so that a detection error in peak/bottom detection can be reduced. Depending on cases, the equalizer unit 8 can be omitted.

Figure 8A:
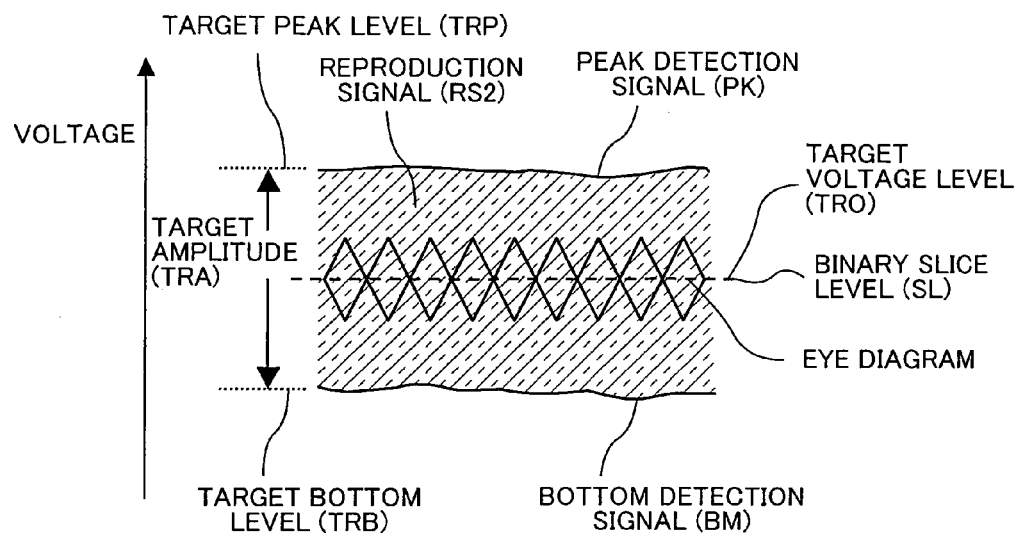
FIGS. 8(a) and 8(b) are explanatory diagrams for the operation of an asymmetry detector of FIG. 6.
Figure 8B:
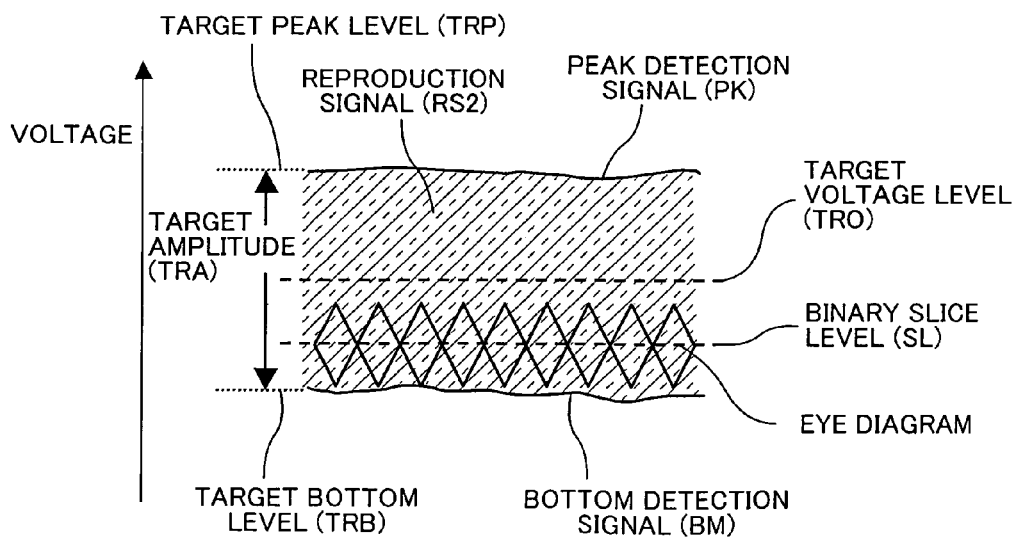

Next, the operation of the asymmetry detector 30 of FIG. 6 will be described with reference to FIGS. 8(a) and 8(b). The input reproduction signal (RS1) is given predetermined gain and offset by the operational amplifier unit 1 to be the reproduction signal (RS2) in the next stage. The reproduction signal (RS2) is given to the peak detection unit 2 and the bottom detection unit 3 via the equalizer unit 8, and a peak thereof is detected by the peak detection unit 2, so that a peak detection signal (PK) is obtained, and a bottom thereof is detected by the bottom detection unit 3, so that a bottom detection signal (BK) is obtained. In the amplitude detection unit 4, for example, the bottom detection signal (BM) is subtracted from the peak detection signal (PK), thereby obtaining an amplitude information signal (AM). In the offset detection unit 5, for example, the peak detection signal (PK) and the bottom detection signal (BM) are averaged out, thereby obtaining an offset information signal (OF). The gain/offset control unit 6 performs control of the gain and the offset of the operational amplifier unit 1 so that the amplitude information signal (AM) becomes equal to a target amplitude (TRA) and the offset information signal (OF) becomes equal to a target voltage level (TRO).

By this control, the peak (PK) and bottom (BM) of the reproduction signal (RS2) can be made to substantially correspond to the target peak level (TRP) and the target bottom level (TRB), respectively. In this case, when asymmetry is absent in the reproduction signal, the location of the center of an eye diagram is equal to the target voltage level (TRO), but when asymmetry is present in the reproduction signal, the location of the center of an eye diagram is shifted from the target voltage level (TRO), as shown in FIG. 8(b).

Then, binarization is performed by the binarization unit 7 while adjusting a slice level (SL) so that the duty ratio after the binarization of the reproduction signal (RS3) substantially becomes a predetermined value. When binarization is performed in this manner, the slice level (SL) corresponds to the center of an eye diagram and an operation of a difference between the slice level (SL) obtained in this manner and the target voltage level (TRO) is performed, thereby allowing calculation of the asymmetry amount. When the target voltage level (TRO) is the ground level (GND), the slice level (SL) itself becomes the asymmetry amount information (ASM).

As has been described, by controlling the signal amplitude and the offset, without depending on the asymmetry amount of the input reproduction signal, i.e., the DC level of the reproduction signal, the amplitude of the reproduction signal is normalized at a constant value and offset control can be performed so that peaks/bottoms thereof can be defined within a certain range. Then, the slice level (SL) at which the duty ratio after the binarization substantially becomes a predetermined value is obtained, so that the location of the center of the reproduction signal eye pattern can be detected and the asymmetry amount can be accurately measured.

Figure 9A:
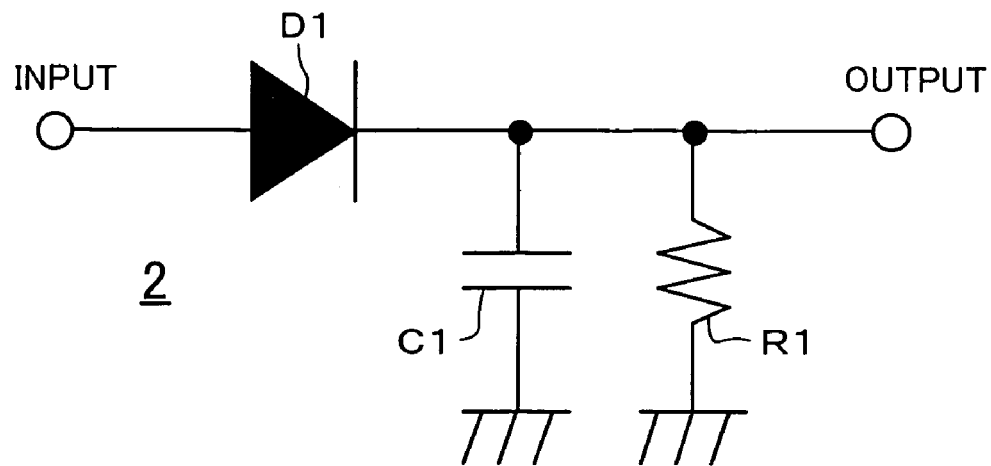
FIG. 9(a) is a circuit diagram illustrating an example of a peak detection unit of FIG. 6.
Figure 9B:
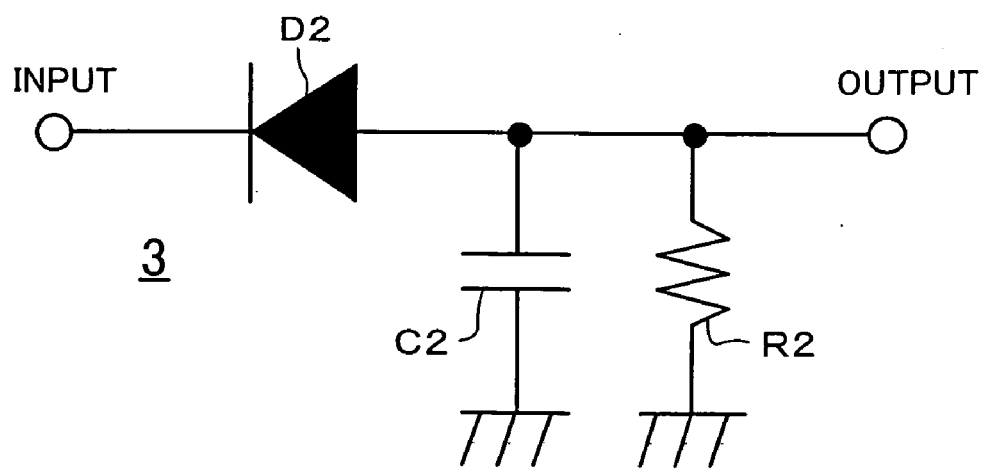
FIG. 9(b) is a circuit diagram illustrating an example of a bottom detection unit of FIG. 6.

As shown in FIG. 9(a), the peak detection unit 2 of FIG. 6 may include a diode D1 and a capacitor C1 and a resistor R1. Moreover, as shown in FIG. 9(b), the bottom detection unit 3 may include a diode D2, a capacitor C2 and a resistor R2.

In some case, an asymmetry amount information (ASM2) can be obtained directly from the gain/offset control unit 6 of FIG. 6. When the input reproduction signal (RS1) is a signal from which the DC component has been removed beforehand, the eye center of the input reproduction signal is substantially equal to a reference potential (e.g., TRO). On the other hand, the gain/offset control unit 6 performs control so that the peak (PK) and bottom (BM) of the reproduction signal (RS2) substantially correspond to the target peak level (TRP) and the target bottom level (TRB), respectively, so that offset control for compensating according to the asymmetry amount is performed. Therefore, information for offset control in the gain/offset control unit 6 can be used as the asymmetry amount information (ASM2).

Figure 10A:
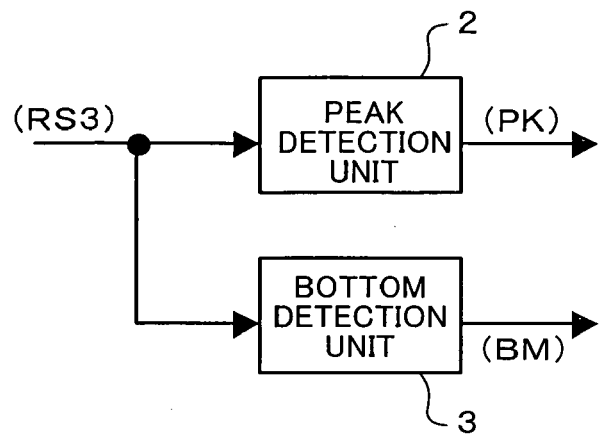
FIGS. 10(a) and 10(b) are block diagrams illustrating modified examples of the waveform detection unit of FIG. 6, respectively.

FIG. 10(a) is a diagram illustrating a modified example of the waveform detection unit 31 of FIG. 6. According to FIG.

10(a), the waveform detection unit 31 merely includes the peak detection unit 2 and the bottom detection unit 3. The gain/offset control unit 6, in this case, performs control of the gain and the offset of the operational amplifier unit 1 so that the output (PK) of the peak detection unit 2 becomes equal to the target peak level (TRP) and the output (BM) of the bottom detection unit 3 becomes equal to the target bottom level (TRB).

Figure 10B:
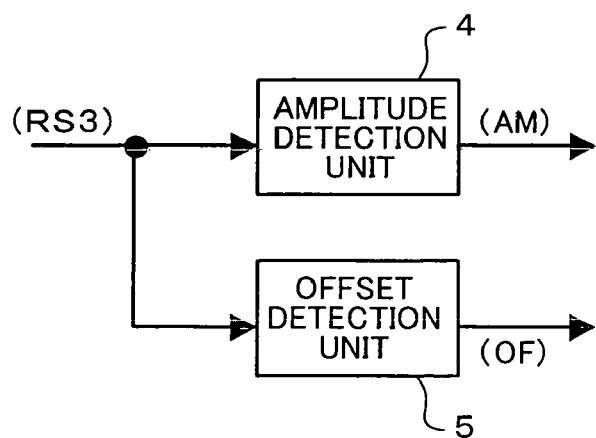

FIG. 10(b) is a diagram illustrating another modified example of the waveform detection unit 31 of FIG. 6. According to the FIG. 10(b), the waveform detection unit 31 merely includes the amplitude detection unit 4 and the offset detection unit 5. The gain/offset control unit 6, in this case, performs control of the gain and the offset of the operational amplifier unit 1 so that the amplitude information signal (AM) is equal to the target amplitude (TRA) and the offset information signal (OF) is equal to the target voltage level (TRO).

Figure 11:
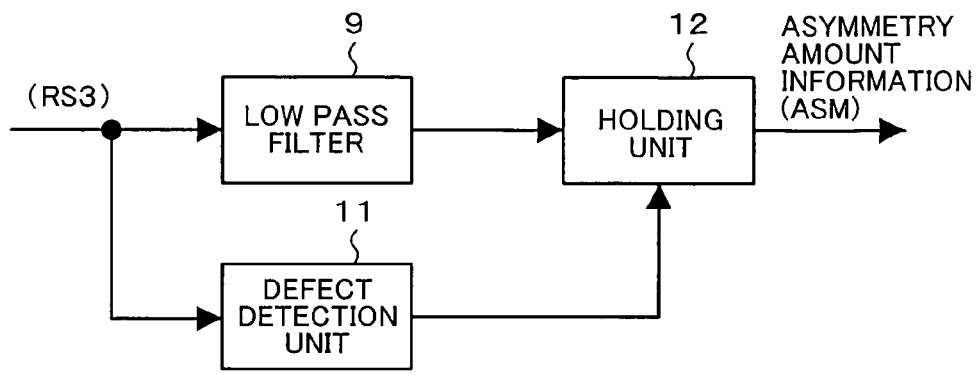
FIG. 11 is a block diagram illustrating a modified example of a DC component extraction unit of FIG. 6.
Figure 12:
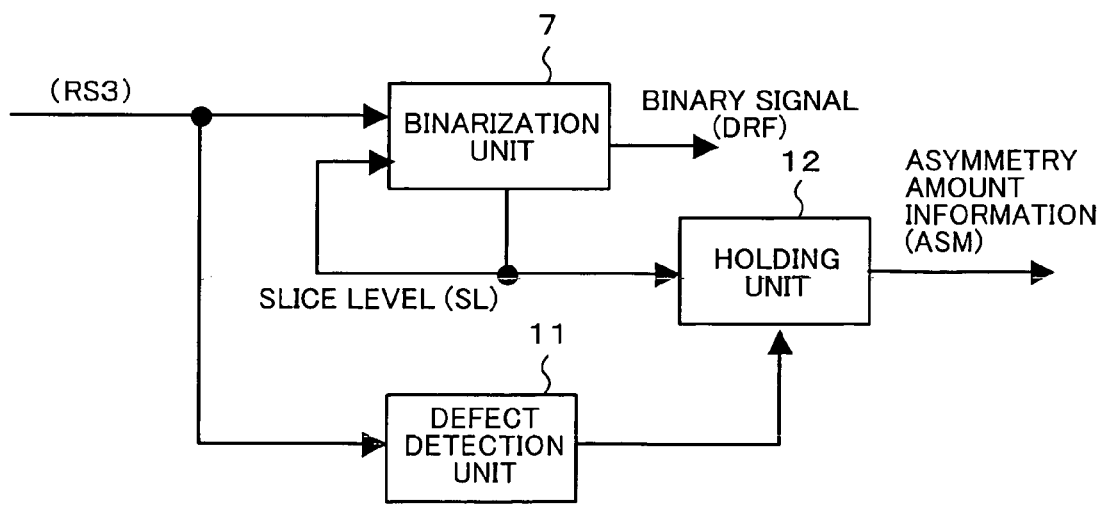
FIG. 12 is a block diagram illustrating another modified example of the DC component extraction unit of FIG. 6.
Figure 13:
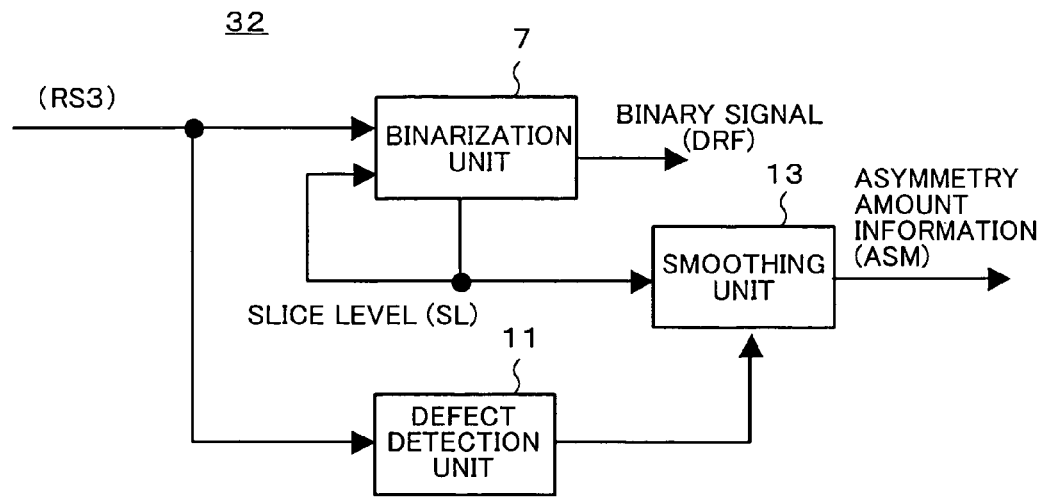
FIG. 13 is a block diagram illustrating still another modified example of the DC component extraction unit of FIG. 6.

FIGS. 11, 12 and 13 are block diagrams illustrating modified examples of the DC component extraction unit 32 of FIG. 6, respectively.

First, the binarization unit 7 of FIG. 6 may be replaced with a low pass filter 9 as shown in FIG. 11 to extract DC component information of a reproduction signal. The output signal (RS2) of the operational amplifier unit 1 or the output signal (RS3) of the equalizer unit 8 is made to pass through the low pass filter 9 so that a modulation frequency component is removed and then only the DC component information of the reproduction signal is extracted. An output of the low pass filter 9 indicates the DC component information of the reproduction signal and has a strong correlation with asymmetry. In this case, the asymmetry amount information (ASM) which is obtained is easily influenced by waveform distortion of the reproduction signal and accuracy is slightly reduced, compared to a method using the binarization unit 7. However, a simple circuit configuration can be advantageously achieved. By controlling the signal amplitude and the offset so that the reproduction signal is effectively within a predetermined range, the location of the center of a reproduction signal eye pattern can be detected and the asymmetry amount can be detected in a simple manner.

The cutoff frequency of the low pass filter 9 is usually set to be lower than a frequency obtained from the reciprocal of a maximum inverse period determined by a modulation rule of the reproduction signal. Removal of a modulation frequency component of the reproduction signal allows detection of only the asymmetry amount information (ASM) by extraction of DC component information.

Furthermore, as shown in FIG. 11, a defect detection unit 11 for detecting a defect of the reproduction signal and outputting a defect detection signal and a holding unit 12 for receiving an output of the low pass filter 9 and the defect detection signal as inputs and holding the output of the low pass filter 9 during a defect detecting period may be further provided. The output of the low pass filter 9 fluctuates during the defect detection period. Therefore, during the defect detection period, the output of the low pass filter 9 is held at a previous value and is not output as the asymmetry amount, so that variation of a detected value for the asymmetry amount due to a defect of the reproduction signal and the like can be prevented.

Moreover, as shown in FIG. 12, the DC component extraction unit 32 may further include, in addition to the binarization unit 7, the defect detection unit 11 for detecting a defect of a reproduction signal and outputting a defect detection signal and the holding unit 12 for receiving the slice level (SL) of the binarization unit 7 and the defect detection signal as inputs and holding the slice level (SL) of the binarization unit 7 during the defect detection period.

Furthermore, as shown in FIG. 13, the DC component extraction unit 32 may include a smoothing unit 13 for smoothing the slice level (SL) of the binarization unit 7. By obtaining the asymmetry amount of the reproduction signal from the output of the smoothing unit 13, fluctuation of the detected value of the asymmetry amount due to variation in the reproduction signal caused by a partial defect on an information recording medium can be suppressed. Note that the smoothing unit 13 may include an integrator circuit or an accumulator for integrating the slice level (SL) of the binarization unit 7. Moreover, during the defect detection period, integration processing of the smoothing unit 13 can be stopped or initialized.

Figure 14:
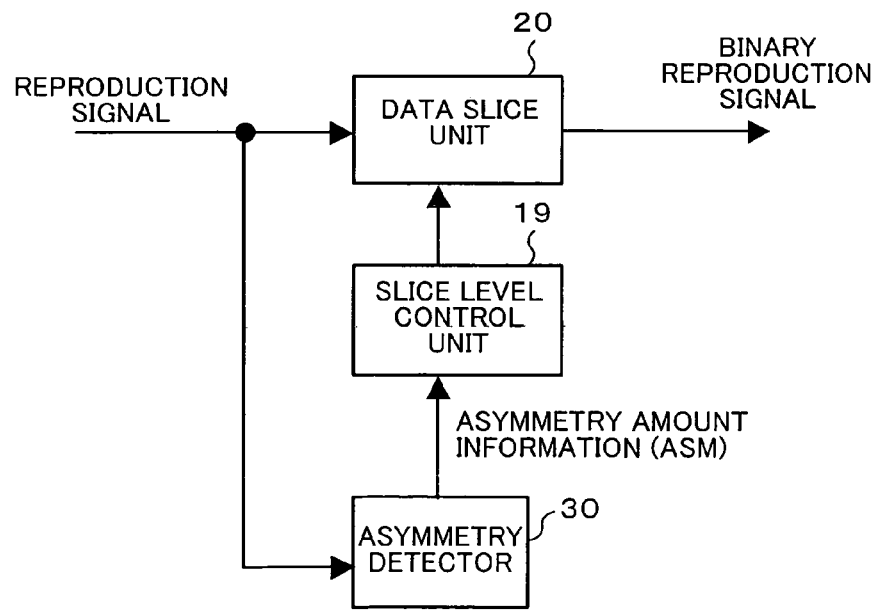
FIG. 14 is a block diagram illustrating an application example of the asymmetry detector of FIG. 6.

FIG. 14 is a block diagram illustrating an application example of the asymmetry detector 30 of FIG. 6. The signal processing device of FIG. 14 includes, in addition to the asymmetry detector 30 of FIG. 6, a data slice unit 20 for performing binarization of a reproduction signal of recorded information on a recording medium, a slice level control unit 19 for controlling the binary slice level (DSL) of the data slice unit 20 based on the asymmetry amount information (ASM) obtained from the asymmetry detector 30.

Figure 1A:
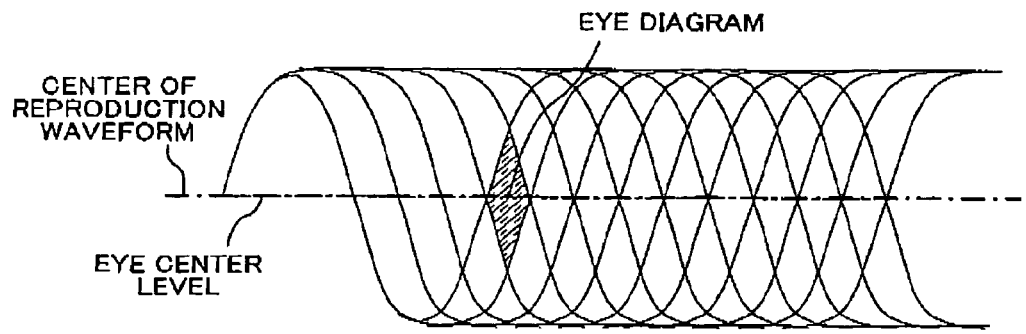
FIGS. 1(a) and 1(b) are diagrams illustrating an eye pattern in a reproduction signal waveform of an optical disk.
Figure 1B:
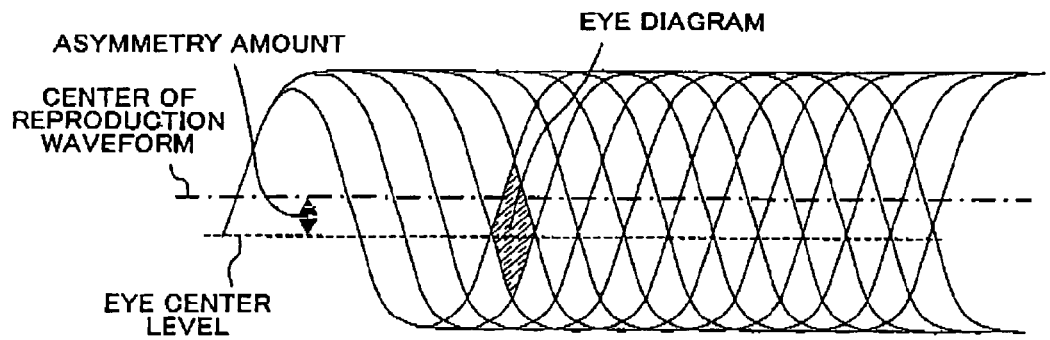
Figure 2:
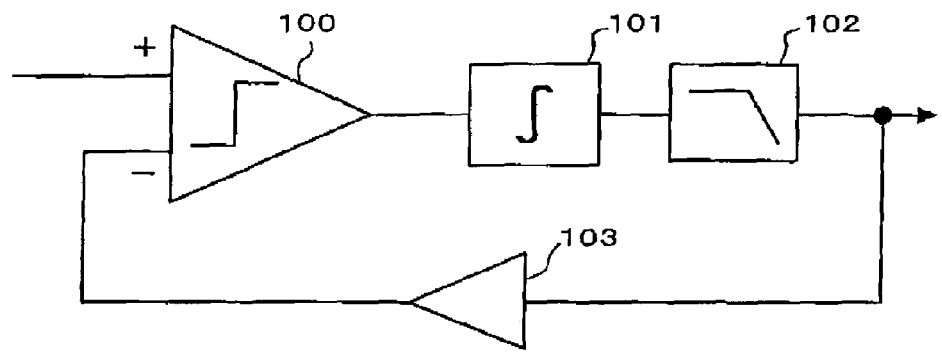
FIG. 2 is a block diagram of a binarization circuit in a conventional signal processing device.
Figure 3:
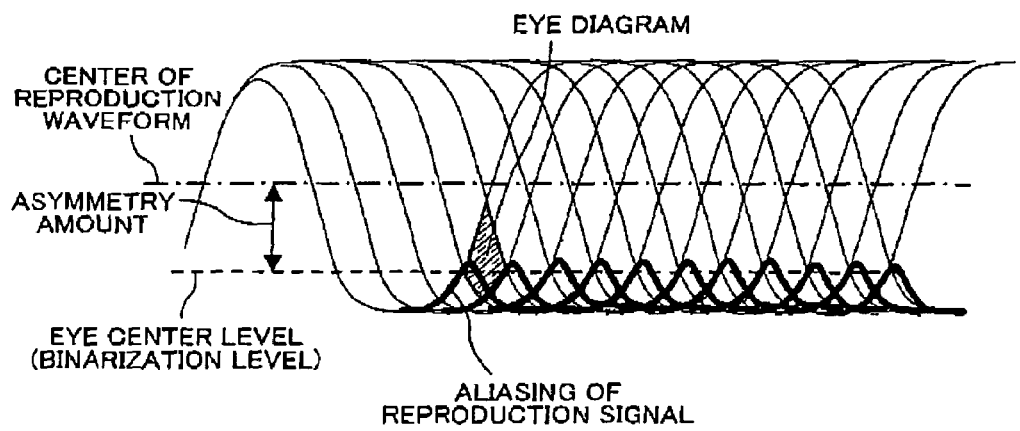
FIG. 3 is a diagram illustrating an eye pattern in a reproduction signal waveform of an optical disk when aliasing distortion occurs and a large asymmetry is present.
Figure 4:
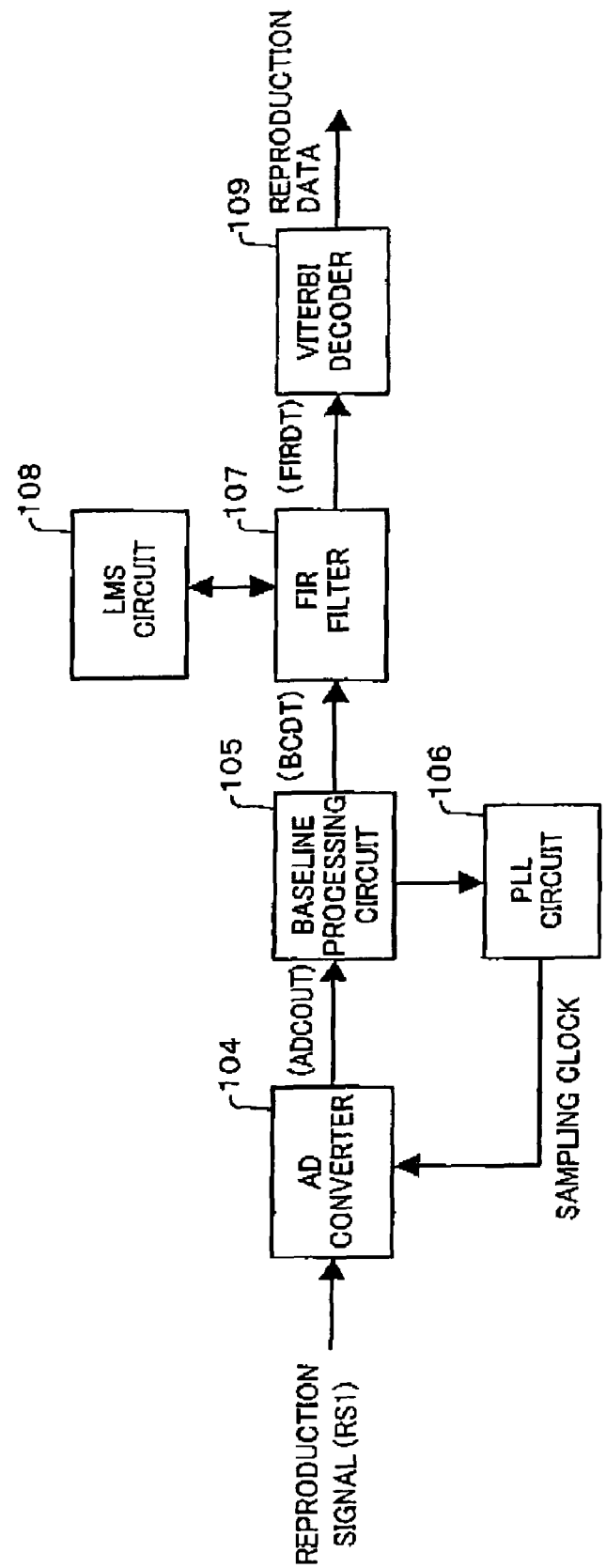
FIG. 4 is a block diagram of a conventional signal processing device using the PRML technique.
Figure 5:
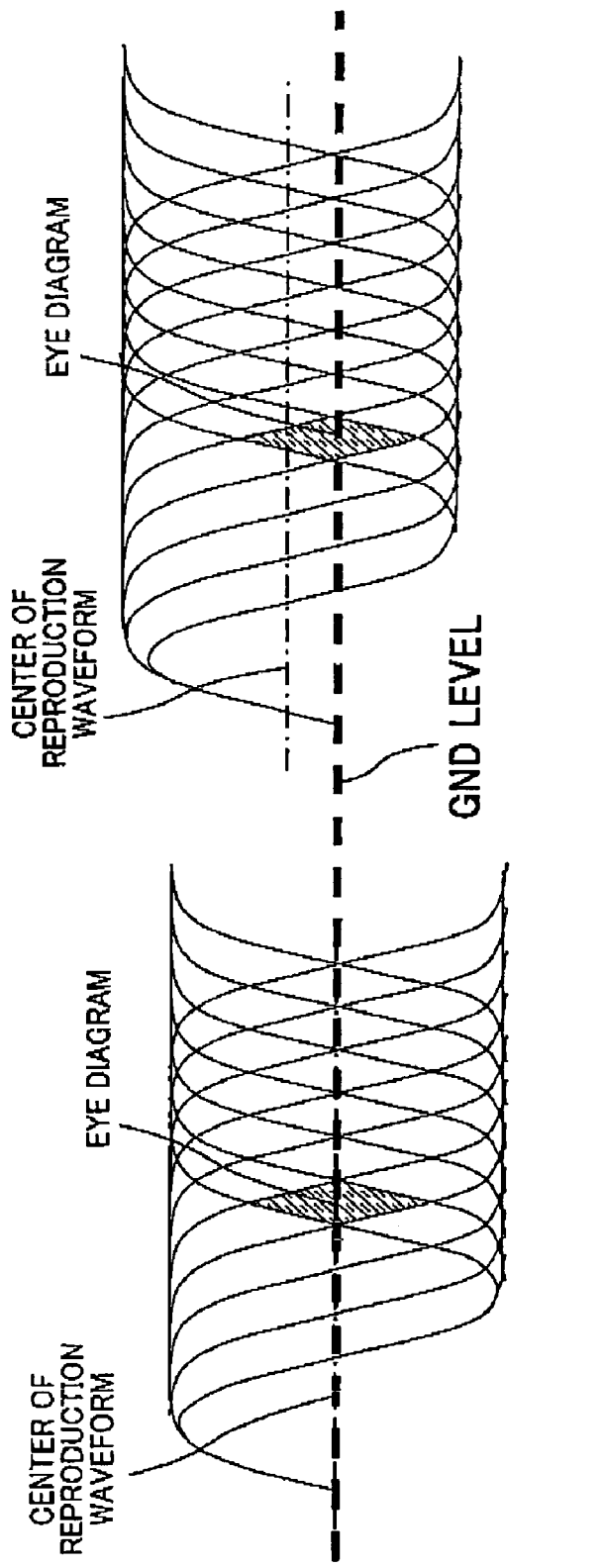
FIGS. 5(a) and 5(b) are diagrams illustrating an eye pattern after a DC component has been removed from a reproduction signal of an optical disk.

As has been described, when the high frequency band is emphasized with a large asymmetry, the aliasing of the reproduction signal shown in FIG. 3 is apt to be generated and the aliasing overlaps the eye center level, i.e., the binarization level. Accordingly, a data error often occurs. Then, when a symmetry amount is large, the slice level (DSL) of the data slice unit 20 is offset by the slice level control unit 19 in a direction in which a distance of the slice level from the aliasing portion of the reproduction signal is increased, thereby reducing an error due to the aliasing.

Figure 15:
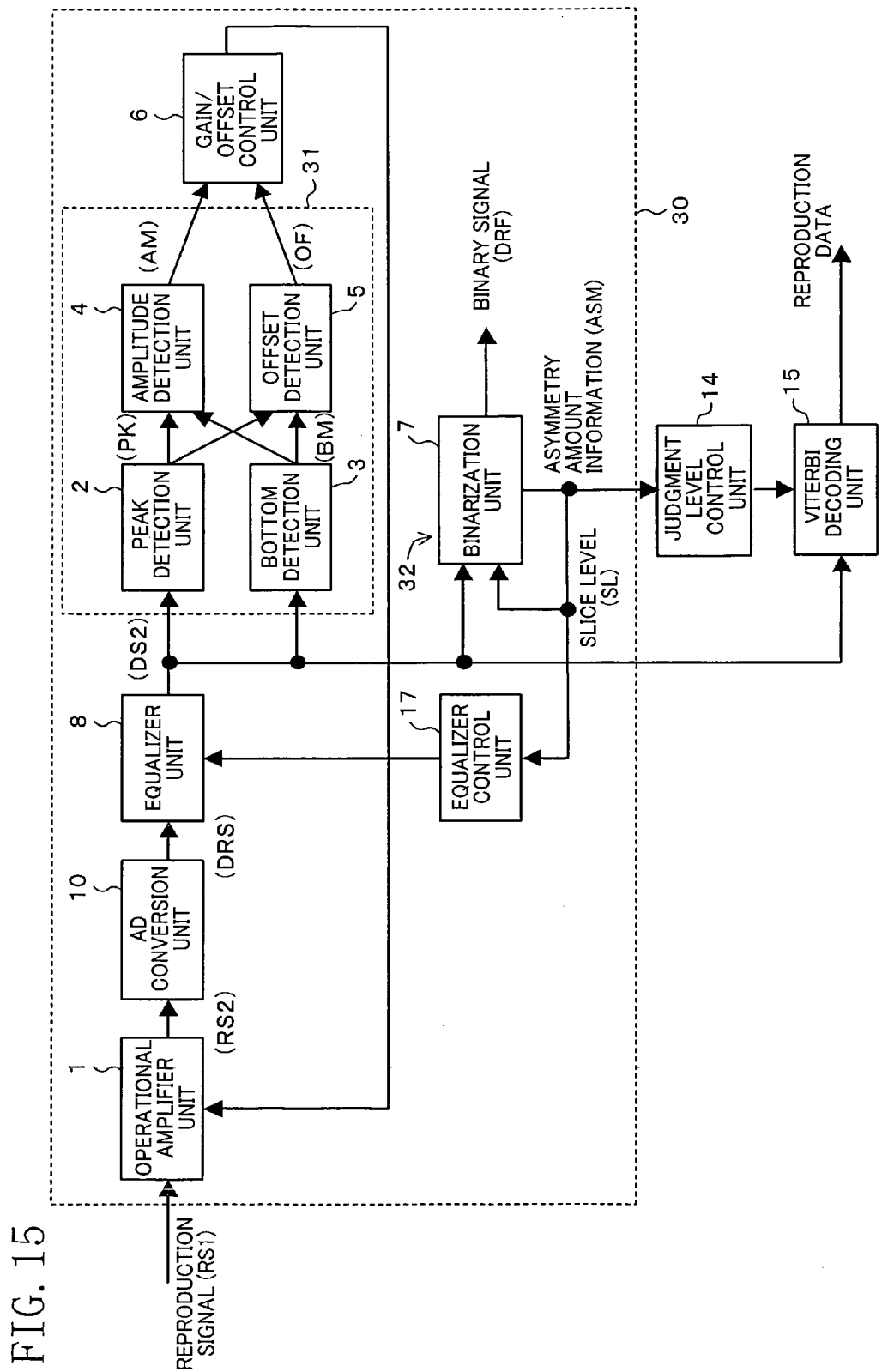
FIG. 15 is a block diagram illustrating another exemplary configuration of the signal processing device of the present invention.

FIG. 15 is a block diagram illustrating another exemplary configuration of the signal processing device according to the present invention. In the asymmetry detector 30 of FIG. 15, the AD conversion unit 10 is arranged in the next stage to the operational amplifier unit 1 of FIG. 6 and the equalizer control unit 17 is added. The AD conversion unit 10 receives an output (RS2) of the operational amplifier unit 1 as an input and performs analog-to-digital conversion. The equalizer unit 8 of FIG. 15 receives an output (DRS) of the AD conversion unit 10 as an input and emphasizes a high frequency band thereof. The output (DS2) of the equalizer unit 8 is supplied to the waveform detection unit 31 and the binarization unit 7 as in FIG. 6. Note that an analog type equalizer unit 8 may be arranged between the operational amplifier unit 1 and the AD conversion unit 10 as in FIG. 6. A conversion characteristic of the AD conversion unit 10 is not limited to a linear characteristic but may be a non linear characteristic.

Figure 16A:
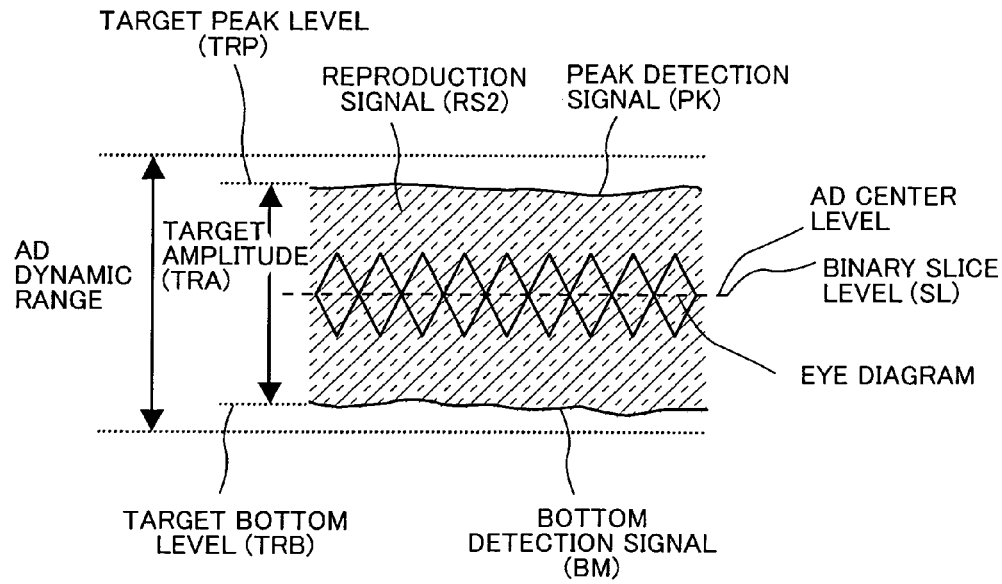
FIGS. 16(a) and 16(b) are explanatory diagrams for the operation of the signal processing device of FIG. 15.
Figure 16B:
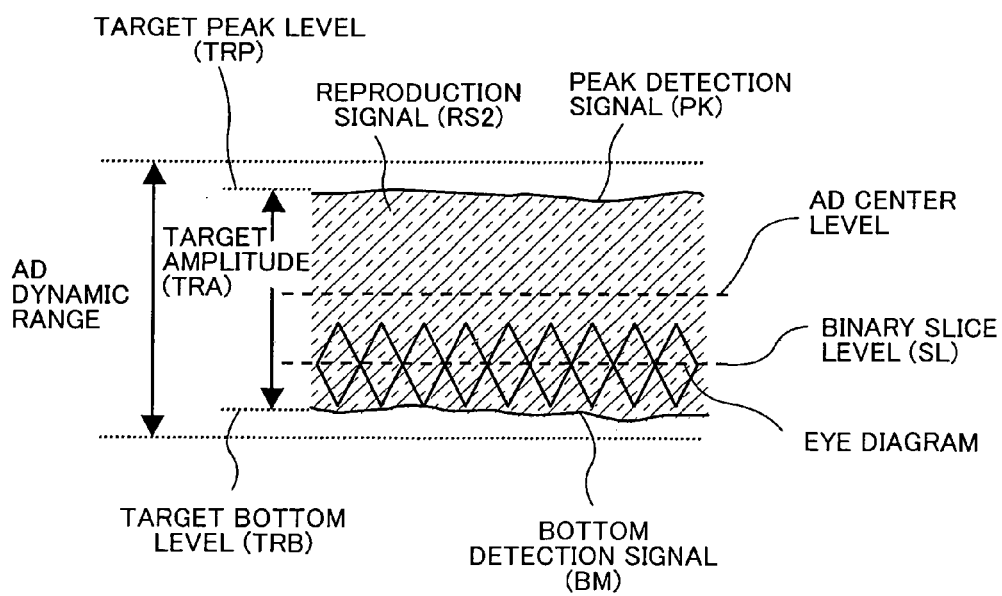

Next, the operation of the asymmetry detector 30 of FIG. 15 will be described with reference to the FIG. 16(a) and FIG. 16(b). Although the basic operation is the same as that of FIG. 6, the operation of the asymmetry detector 30 of FIG. 15 is different from that of FIG. 6 in that an analog reproduction signal (RS2) is converted into a digital reproduction signal (DRS) by the AD conversion unit 10 and subsequent processing is performed by digital signal processing.

The input reproduction signal (RS1) is given predetermined gain and offset by the operational amplifier unit 1 to be the reproduction signal (RS2) in the next stage. The reproduction signal (RS2) is analog-to-digital converted by the AD conversion unit 10 to be a multilevel digital signal (DRS). The digital signal (DRS) is given to the peak detection unit 2 and the bottom detection unit 3 via the equalizer unit 8, a peak thereof is detected by the peak detection unit 2, so that a peak detection signal (PK) is obtained, and a bottom thereof is detected by the bottom detection unit 3, so that a bottom detection signal (BM) is obtained. In the amplitude detection unit 4, for example, the bottom detection signal (BM) is subtracted from the peak detection signal (PK), thereby obtaining an amplitude signal (AM). In the offset detection unit 5, for example, the peak detection signal (PK) and the bottom detection signal (BM) are averaged out, thereby obtaining an offset information signal (OF). The gain/offset control unit 6 performs control of the gain and offset of the operational amplifier unit 1 so that the amplitude information signal (AM) becomes equal to a target amplitude (TRA) and the offset information signal (OF) becomes equal to an AD center level.

By this control, the peak (PK) and the bottom (BM) of the reproduction signal (RS2) can be made to substantially correspond to the target peak level (TRP) and the target bottom level (TRB), respectively. In this case, when asymmetry is absent in the reproduction signal, the location of the center of an eye diagram is equal to the AD center level, but when asymmetry is present in the reproduction signal, the location of the center of an eye diagram is shifted from the AD center level, as shown in FIG. 16(*b*).

Then, binarization is performed by the binarization unit 7 while adjusting a slice level (SL) so that the duty ratio after the binarization of the reproduction signal (DS2) substantially becomes a predetermined value. When binarization is performed in this manner, the slice level (SL) substantially corresponds to the center of an eye diagram. An operation of a difference between the slice level (SL) obtained in this manner and the AD center level is performed, thereby allowing calculation of the asymmetry amount. When the AD center level is the ground level (GND), the slice level (SL) itself becomes information for the asymmetry amount (ASM).

As has been described, by controlling the signal amplitude and the offset so that the reproduction signal is effectively within a predetermine level range and obtaining the slice level (SL) at which the duty ratio after the binarization substantially becomes a predetermined value, the location of the center of the reproduction signal eye pattern can be detected and the asymmetry amount can be accurately measured. Moreover, the reproduction signal is converted into a digital signal by the AD conversion unit 10 and then processed, so that a detection error often generated due to an electric offset, a drift, a variation and the like in an analog signal processing device can be eliminated.

Moreover, by using a clock phase-synchronized with the reproduction signal as an AD conversion clock of the AD conversion unit 10, time constants for peak detection, bottom detection, gain/offset control and the like are automatically changed according to the transfer rate of an input signal. Therefore, measures to cope with CAV (constant angular velocity) can be advantageously taken in a simple manner.

Moreover, the equalizer unit 8 includes a digital filter such as an FIR filter, thus allowing highly accurate equalization. Accordingly, accuracy in amplitude and offset control can be improved, so that high accurate asymmetry detection can be performed.

The equalizer control unit 17 of FIG. 15 controls the emphasis amount of the high frequency band of the equalizer unit 8 according to the asymmetry amount information (ASM). By adjusting the emphasis amount of the high frequency band, based on the information for the asymmetry amount, so that a reproduction error rate is reduced, highly reliable data reproduction can be achieved. As described above, when a high frequency band is emphasized with a large asymmetry, the aliasing of the reproduction signal shown in FIG. 3 is apt to be generated and the aliasing overlaps the eye center level, i.e., the binarization level. Accordingly, a data error easily occurs. Then, when an asymmetry amount is large, emphasis of the high frequency band of the equalizer unit 8 is suppressed or the high frequency band is attenuated to reduce the generation of the aliasing phenomenon of a reproduction signal. Thus, an improved error rate can be achieved.

Note that the waveform detection unit 31 of FIG. 15 can be also replaced with a waveform detection unit having the configuration of FIG. 10(*a*) or FIG. 10(*b*). When the input reproduction signal (RS1) is a signal from which a DC component has been removed beforehand, the asymmetry amount information can be obtained directly from the gain/offset control unit 6 as in of FIG. 6.

The signal processing device of FIG. 15 further includes a Viterbi decoding unit 15 for receiving an output (DS2) of the equalizer unit 8 as an input and outputting decoded data corresponding to a state transition maximum-likelihood-estimated by Viterbi decoding and a judgment level control unit 14 for controlling a judgment level of the Viterbi decoding unit 15 according to the asymmetry amount information (ASM).

With the configuration of FIG. 15, the judgment level of the Viterbi decoding unit 15 is adjusted based on the asymmetry amount information (ASM) of the reproduction signal so as to be optimized. Thus, the operation of the Viterbi decoding unit 15 can be stabilized and the reproduction error rate can be reduced. For example, when a PR (n, m, m, n) equalized signal is Viterbi decoded, making use of the target peak level (TRP), the target bottom level (TRB) and the asymmetry amount (ASM), each of TRP, ASM, TRB, a level TRV1 dividing a distance between TRP and ASM in the ratio of n:m, and a level TRV2 dividing a distance between ASM and TRB in the ratio of m:n are used as values for decision points for Viterbi decoding and respective center values between TRP and TRV1, between TRV1 and ASM, between ASM and TRV2 and between TRV2 and TRB are used as decision thresholds, so that the judgment level of the Viterbi decoding unit 15 can be adjusted according to asymmetry to be optimized.

Figure 17:
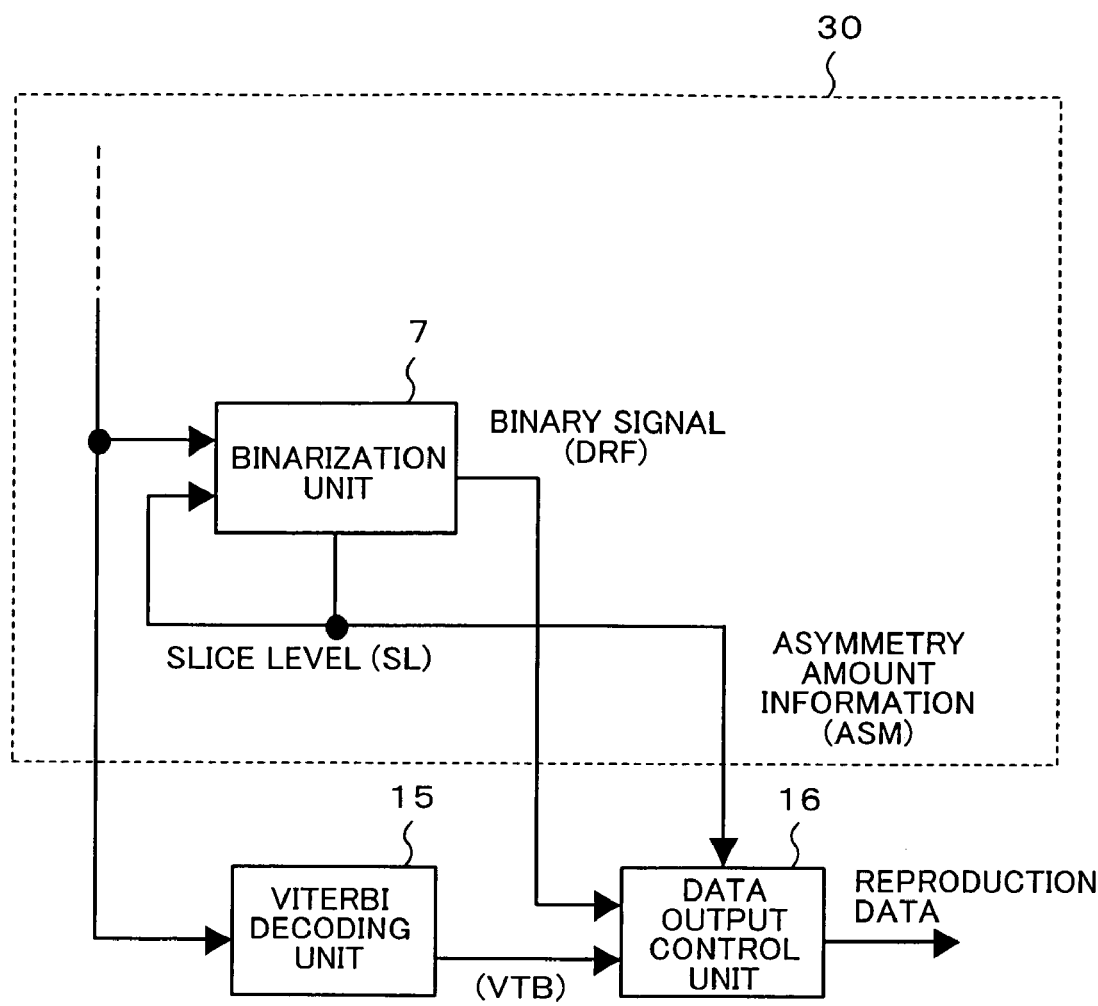
FIG. 17 is a block diagram illustrating a modified example of the signal processing device of FIG. 15.

FIG. 17 is a block diagram illustrating a modified example of the configuration of FIG. 15. In FIG. 17, instead of the judgment control unit 14, a data output control unit 16 is provided. The data output control unit 16 selectively outputs either one of an output (DRF) of the binarization unit 7 and an output (VTB) of the Viterbi decoding unit 15 based on the asymmetry amount information.

Assume that a judgment level of Viterbi detection is vertically asymmetric. When asymmetry of a reproduction signal is increased and symmetry is largely lost, it becomes difficult to perform Viterbi decoding and correct decoding data can not be obtained. For strong asymmetry, with an output (DRF) of the binarization unit 7, a limit level is increased, so that it becomes easier to achieve normal data detection. Then, by selecting the output (DRF) of the binarization unit 7 when the asymmetry amount is equal to or larger than a predetermined level and selecting the output (VTB) of the Viterbi decoding unit 15 when the asymmetry amount is smaller than the predetermined value, highly reliable reproduction data can be output as final output data. Note that if output timings for DRF and VTB are made to agree with each other, DRF and VTB can be changed according to the asymmetry amount information on real time.

INDUSTRIAL APPLICABILITY

As has been described, according to the present invention, an signal amplitude and offset are controlled so that a reproduction signal is effectively within a predetermined range and a slice level with which a duty ratio after binarization substantially becomes a predetermined value. Thus, the location of the center of an eye diagram is detected and the amount of asymmetry can be accurately measured. Change of a judgment level of a Viterbi decoder, equalizer adjustment or application of a binarization offset is performed, based on information for the asymmetry amount, so that an error rate can be improved.

The invention claimed is:

1. A signal processing device for reproducing recorded information on an information recording medium, comprising:
    a feedback loop including operational amplifier means for amplifying a reproduction signal of the recorded information and a gain/offset control means for controlling a gain and an offset of the operational amplifier means so that each of an amplitude and an offset of an output of the operational amplifier means becomes a predetermined value, respectively; and
    direct-current component extraction means for extracting direct-current component information of the reproduction signal from signals of the feedback loop,
    wherein the signal processing device supplies the direct-current component information as information indicating an asymmetry amount of the reproduction signal.

2. The signal processing device of claim 1, wherein the direct-current component extraction means is binarization means for receiving the output of the operational amplifier means as an input and performing binarization while adjusting a slice level by feedback control so that a duty ratio after the binarization becomes a predetermined value.

3. The signal processing device of claim 1, wherein the direct-current component extraction means is a low pass filter for receiving the output of the operational amplifier means.

4. The signal processing device of claim 3, wherein a cutoff frequency of the low pass filter is set to be lower than a frequency obtained from a reciprocal of a maximum inverse period determined by a modulation rule of the reproduction signal.

5. The signal processing device of claim 1, wherein when an input reproduction signal of the operational amplifier means is a signal from which a direct-current component has been removed beforehand, offset control information from the gain/offset control means to the operational amplifier means is supplied as information indicating the asymmetry amount.

6. The signal processing device of claim 1, further comprising waveform detection means for detecting, based on the output of the operational amplifier means, information for a waveform of the reproduction signal and supplying the waveform information to the gain/offset control means.

7. The signal processing device of claim 6, wherein the waveform detection means includes:
    peak detection means for receiving the output of the operational amplifier means as an input and performing peak detection; and
    bottom detection means for receiving the output of the operational amplifier means as an input and performing bottom detection.

8. The signal processing device of claim 6, wherein the waveform detection means includes:
    amplitude detection means for receiving the output of the operational amplifier means as an input, detecting an amplitude of the reproduction signal and outputting an amplitude information signal; and
    offset detection means for receiving the output of the operational amplifier means as an input, detecting an offset of the reproduction signal and outputting an offset information signal.

9. The signal processing device of claim 6, wherein the waveform detection means includes:
    peak detection means for receiving the output of the operational amplifier means and performing peak detection;
    bottom detection means for receiving the output of the operational amplifier means and performing bottom detection;
    amplitude detection means for receiving an output of the peak detection means and an output of the bottom detection means as inputs, performing an operation to obtain an output signal amplitude of the operational amplifier means and outputting an amplitude information signal; and
    offset detection means for receiving the output of the peak detection means and the output of the bottom detection means as inputs, performing an operation to obtain an output signal offset of the operational amplifier means and outputting an offset information signal.

10. The signal processing device of claim 1, further comprising equalizer means, located between the operational amplifier means and the gain/offset control means, for emphasizing a high frequency band of the output of the operational amplifier means.

11. The signal processing device of claim 10, further comprising equalizer control means for controlling an emphasis amount of the high frequency band of the equalizer means,
    wherein the emphasis amount of the high frequency band of the equalizer means is adjusted, based on the information for the asymmetry amount, so that a reproduction error rate is reduced.

12. The signal processing device of claim 11, wherein the emphasis amount of the high frequency band of the equalizer means when the asymmetry amount is larger than a predetermined value is set to be smaller than that when the asymmetry amount is smaller than a predetermined value.

13. The signal processing device of claim 1, further comprising:
    defect detection means for detecting a defect of the reproduction signal; and
    holding means for holding the direct-current component information during a defect detection period.

14. The signal processing device of claim 2, further comprising smoothing means for smoothing a slice level of the binarization means,
    wherein an output of the smoothing means is supplied as information indicating the asymmetry amount of the reproduction signal.

15. The signal processing device of claim 14, wherein the smoothing means includes an integrator or an accumulator for receiving the slice level of the binarization means.

16. The signal processing device of claim 14, further comprising defect detection means for detecting a defect of the reproduction signal,
wherein integration processing of the smoothing means is stopped or initialized during a defect detection period.

17. The signal processing device of claim 1, further comprising:
data slice means for binarizing the reproduction signal of the recorded information; and
slice level control means for controlling a binary slice level of the data slice means,
wherein adjustment is made, based on the information for the asymmetry, by applying an offset to the binary slice level of the data slice means so that a reproduction error rate is reduced.

18. The signal processing device of claim 2, further comprising an AD conversion means, located between the operational amplifier means and the gain/offset control means, for sampling the output of the operational amplifier means and then performing analog-to-digital conversion to the output of the operational amplifier means,
wherein the binarization means receives sampling data provided by the AD conversion means as an input.

19. The signal processing device of claim 18, further comprising:
Viterbi decoding means for outputting decoded data corresponding to a state transition maximum-likelihood-estimated by Viterbi decoding of the sampling data; and
judgment level control means for controlling, based on the asymmetry amount information, a judgment level of the Viterbi decoding means so that a reproduction error rate is reduced.

20. The signal processing device of claim 18, further comprising;
Viterbi decoding means for outputting decoded data corresponding to a state transition maximum-likelihood-estimated by Viterbi decoding of the sampling data; and
data output control means for selectively outputting, based on the asymmetry amount information, either one of the output of the binarization means or an output of the Viterbi decoding means so that a reproduction error rate is reduced.

21. The signal processing device of claim 20, wherein the data output control means selects the output of the Viterbi decoding means when the asymmetry amount is smaller than a predetermined value and selects the output of the binarization means when the asymmetry amount is equal to or larger than the predetermined value.

22. A signal processing method for reproducing recorded information on an information recording medium, comprising the steps of:
controlling a gain and an offset of an operational amplifier means for amplifying a reproduction signal of the recorded information in a feedback loop so that an amplitude and an offset of an output of the operational amplifier means are set at a predetermined value, respectively;
extracting a direct-current component information of the reproduction signal from signals of the feedback loop; and
supplying the direct-current component information as information indicating an asymmetry amount of the reproduction signal.

* * * * *